May 26, 1970 L. V. WESTBROOK 3,514,672
SOLID-STATE TIMER SYSTEM
Filed April 10, 1968
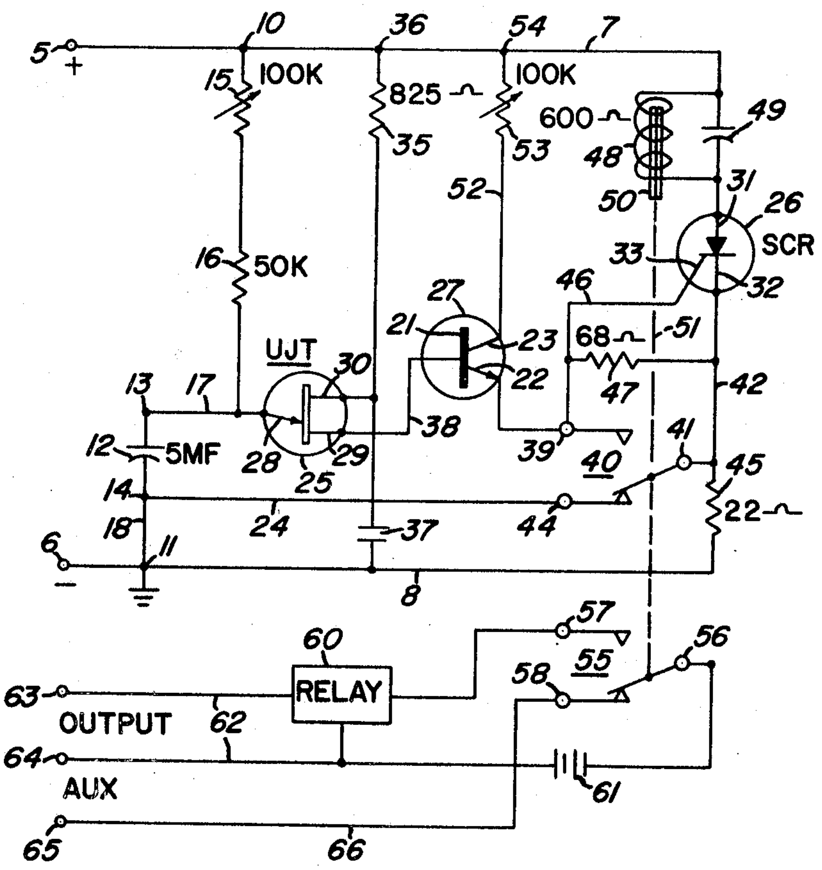
INVENTOR.
Lowell V. Westbrook
BY Harry M. Saragovitz, Edward J. Kelly, Herbert Berl & S. Dubroff
ATTORNEYS United States Patent Office 3,514,672
Patented May 26, 1970

3,514,672

SOLID-STATE TIMER SYSTEM

Lowell V. Westbrook, Excelsior, Minn., assignor, by mesne assignments, to the United States of America as represented by the Secretary of the Army Filed Apr. 10, 1968, Ser. No. 720,251
Int. Cl. H01h 47/32
U.S. Cl. 317—146 6 Claims

ABSTRACT OF THE DISCLOSURE

An electronic pulsing timer system or timer using a resistance-capacitance or RC circuit and a unijunction transistor or UJT connected therewith to gate a silicon-controlled rectifier or SCR alternately ON and OFF on successive pulses. A relay coil in the rectifier output circuit operates single-pole double-throw relay contacts to back-bias and reset the rectifier on alternate pulses.

The present invention relates particularly to electronic timer systems or timers of the pulse output type, and has for its primary object to provide an improved timer system or timer of that type which is adapted for use with solid-state or transistor devices as circuit control or switching elements therein, to simplify the construction and increase the operational reliability thereof.

In the solid-state field there are presently few devices that are readily adapted for use in repetitive pulse circuitry. In addition to the problem of providing proper coupling with other circuit elements for gating pulse signals through timing circuits, there are further problems involved with control or gating operations to achieve a desired timed pulse or signal output and periodic cutting off of current flow, once started, through transistor rectifier-type devices.

Accordingly, it is a further object of this invention, to provide an improved and simplified solid-state or transistorized timer system or timer which combines the advantages of a silicon controlled rectifier as a pulse-responsive switching device and a unijunction transistor as a controlling device, for repetitive ON-OFF operation and output pulse control therein.

In accordance with a present preferred form of the invention, a resistance-capacitance or RC circuit is provided as a simplified timing-pulse source in connection with a unijunction transistor device or UJT which is coupled with a silicon controlled rectifier or SCR to turn the latter ON and OFF, alternately, in response to successive output pulses from the RC circuit.

A relay connected in series with the SCR provides for switching alternate RC pulses through bias resistors to the gate electrode and cathode electrode of the SCR by means of one set of single-pole double-throw contacts. A second set of relay contacts, operable with the first set, may be connected with means for utilizing the timed pulsing action of the system for timing control purposes.

The invention will further be understood from the following description of a preferred embodiment thereof, when considered with reference to the accompanying drawing, and its scope is defined by the appended claims.

Referring to the drawing, in which the single figure is a schematic circuit diagram of an electronic timing system or timer embodying the invention, a source of direct-current operating potential, such as supply terminals 5 and 6, are connected with positive and negative supply leads 7 and 8, respectively, for the system. A source of pulse signals or pulses for the system is provided by a simple variable RC network or circuit connected between the supply leads 7 and 8 at the terminals 10 and 11, the latter being the system ground terminal as indicated.

The RC circuit or pulse source comprises a storage capacitor 12 having positive and negative terminals 13 and 14, respectively, and two charging or current-limiting resistors 15 and 16 connected serially between the terminal 10 and an output lead 17 for the capacitor from the positive terminal 13. A lead 18 from the negative terminal 14 completes the connection to the ground terminal 11 and the supply lead 8. The resistor 15 is variable or adjustable as indicated and is set to provide a desired charging rate for the capacitor 12 and thus the pulse output timing from the RC circuit.

The pulse or signal output of the RC circuit is taken from the capacitor terminals 13 and 14 through the positive output lead 17 and either the negative lead 8 or a second output lead 24, and applied through a unijunction transistor or UJT 25 to a silicon controlled rectifier or SCR 26. The UJT 25 has a diode electrode or rectifier contact 28 and ohmic first and second base contacts or electrodes 29 and 30, respectively. The SCR 26 has an anode or anode electrode 31, a cathode or cathode electrode 32, and a control or gate electrode 33. Both devices represent known forms of such solid-state or transistor devices. A transistor amplifier 27 is provided between the UJT 25 and the SCR 26 as a pulse amplifier as will be seen, and includes a base 21 and emitter and collector electrodes 22 and 23 respectively.

The diode electrode 28 of the UJT 25 is connected to the capacitor output lead 17 while the second base electrode 30 is connected through a current limiting resistor 35 with the positive supply lead 7 at a terminal 36. A filter capacitor 37 is also connected between the second base electrode 30 and the negative supply lead 8. The first base electrode 29 is connected through an output lead 38 with the base electrode 21 of the amplifier 27 and the emitter electrode 22 is connected directly with a first fixed contact 39 of one set of single-pole double-throw relay contacts 40. The movable relay contact 41 is connected with the cathode 32 of the SCR 26 through a cathode lead 42.

The remaining or second fixed relay contact 44 is connected directly with the capacitor negative output lead 24 and thus is also connected conductively with the negative supply lead 8 through the lead 18. This provides a short-circuit connection across a cathode bias resistor 45, which is connected between the cathode lead 42 and the negative supply lead 8, when the relay movable contact 41 is in normal engagement with the second fixed contact 44, as shown. The control or gate electrode 33 of the SCR 26 is connected through a control lead 46 with the relay contact 39, and a second bias resistor 47 for the gate electrode is connected between the leads 42 and 46 as shown. Thus with the movable relay contact 41 in the alternated position, in engagement with the first fixed relay contact 39, the gate bias resistor 47 is short circuited and cathode bias resistor 45 is open circuit. One or the other of the resistors 45 and 47 is thus always in circuit between the emitter 22 and the negative supply lead 8 to complete the emitter circuit.

The collector circuit for the amplifier 27 is provided through a lead 52 and a variable resistor 53 to a connection terminal 54 on the positive supply lead 7.

The anode-cathode circuit of the SCR, from the positive supply lead 7 to the negative supply lead 8, is completed through a relay operating winding or coil 48 connected between the positive supply lead 7 and the anode 31 and provided with a stabilizing capacitor 49 connected in parallel relation therewith. The relay contacts 40 are operated by the relay coil 48 through a movable armature element 50 associated therewith and operably connected with the movable contact element 41 as indicated by the dash line 51.

The contact operating connection indicated at 51 may be extended, as shown, to control a second set of relay contacts 55 which may be a similar single-pole-double-throw type having a movable contact element 56 connected with the relay armature element 50 and movable between two fixed contacts or contact elements 57 and 58 are closed when the contracts 41 and 44 are closed.

Suitable utilization means for timing control by the system may be connected in circuit with the relay contacts 55. In the present example this may include a stepping or other type relay 60 connected in circuit between the contacts 56 and 57 through an operating current source, such as a battery 61, and a pulse output circuit 62 from the relay to output terminals 63 and 64. An auxiliary circuit terminal 65 may be connected through a lead 66 with the relay contact 58 for direct control therefrom in conjunction with the terminal 64.

The operation of the system shown is as follows: With the supply terminals 5 and 6 energized to provide DC operating current to the supply leads 7 and 8 at a desired operating voltage such as 28 volts, for example, which may be the firing voltage for the UJT 25, the resistor 15 is adjusted to provide, in conjunction with the series fixed resistor 16, a limited charging current flow and a desired charging rate for the timing capacitor 12 and thus the timing of the pulse output.

Bleeder current also flows from the positive supply lead 7 through the limiting resistor 35 and the UJT 25 from the base 30 to the base 29 and thence through the lead 38, the transistor 27 and the bias resistor 47, back to the cathode lead 42. The current path from the lead 42 is completed through the relay contacts 41–44 and the leads 24 and 18 back to the negative supply lead 8, to place the UJT 25 in operation. This is not enough current to make the transistor 27 turn ON or to make the gate electrode 33 sufficiently positive with respect to the cathode 32 to fire the SCR. Therefore the operating coil 48 is not energized and the SCR remains nonconducting.

As the timing capacitor 12 charges, it reaches the firing voltage of the SCR. This voltage, from the terminal 13, is applied directly to the diode electrode 28 to raise it positively above the voltage at the first base electrode 29 which is only above the negative terminal 14 by the low voltage drop in the transistor 27 and the bias resistor 47. Upon firing, the resistance between the diode electrode 28 and the first base electrode 29 drops to substantially zero. The UJT 25 conducts and the capacitor 12 discharges through it to fire the transistor 27 and apply an output current pulse through the bias resistor 47 and the path provided by the closed relay contacts 41–44. This applies a high positive bias pulse to the gate electrode 33 and raises it sufficiently above the cathode 32 in a positive direction to fire the SCR 26. Thus the timing capacitor output fires the UJT 25 and through the transistor 27, in turn gates the SCR 26.

The relay coil 48 in series with the SCR is thus energized by current flow therethrough. The current path may be traced from the positive supply lead 7 through the cathode lead 42 and the short-circuit path provided by the closed relay contacts 41–44 to the output lead 24 and the lead 18, and thence back to the negative supply lead 8. The relay is thus energized on the first pulse of the timing capacitor or of the transistor, 25, and remains energized since the SCR 26 will remain conductive or ON as long as current flows through the circuit.

The single-pole double-throw relay contacts 40 are thus normally closed as above described to apply a "forward" or ON bias to the SCR 26 or to the gate electrode 33 from the gate bias resistor 47 on the first or initial pulse. To reset the system or turn OFF the SCR 26, these contacts on the second or succeeding pulse provide a back-bias to turn off the SCR. The back-bias is provided by the cathode bias resistor 45 which is in series with the cathode between it and the negative supply lead 8, and is switched into operation in response to energization of the relay coil 48.

With the relay coil energized, the armature 50 is moved to carry the relay contact 41 from the contact 44 to the alternate contact 39. This action switches the cathode bias resistor 45 into circuit and short-circuits the gating bias resistor 47 for the SCR, so that the next succeeding pulse from the timing capacitor 12 through the transistor 27 and the UJT 25 is applied to the SCR cathode bias resistor 45 instead of the SCR bias resistor 47. This is because the output pulse from the emitter 22 bypasses the resistor 47 by reason of the relay contact 41 being closed with the contact 39, and the amplified pulse current flows then through the bias resistor 45 and back to the output terminal 14 through the negative lead 8 and the connecting lead 18.

The second or next succeeding pulse from the timing capacitor 12, after the first is thus applied to the cathode 32 of the SCR 26 to heavily back-bias and turn it OFF in much the same manner as the first or initial pulse was applied to the gate electrode 33 to turn it ON. The second pulse is effective to do this regardless of the load current because it is applied across the cathode bias resistor 45 which is in series between the cathode 32 and the negative supply lead 8 and is thus in opposition to the anode-cathode or load current flow and highly amplified to effect instant turn-off. Thus the cathode is pulsed positive with a voltage peak that may always be higher than the positive voltage on the anode 31. SCR 26 is positively pulsed OFF and the relay coil or relay is deenergized. The armature element 50 returns the relay contact 41 to the contact 44 in readings for the next pulse and a repetition of the ON-OFF cycle described.

In the operations described, the voltage on the UJT capacitor 12 may build up to a value of .5 to .8 times the supply voltage across the leads 7–8. The UJT 25 peak voltage or voltage at which the base 20 junction breaks down is proportional to the intrinsic stand-off ratio times the voltage between the base 29 and the base 30. The intrinsic stand-off ratio may be anywhere between .47 to .82 for different unijunctions. This voltage will be greater than the voltage on the anode of the SCR. This is because the resistance of the relay coil 48 is much larger than that of the resistor 45 in the cathode circuit 42 of the SCR 26. The relay resistance for 28 volt operation is about 600 ohms. Therefore, the anode is near ground potential when the SCR is conducting.

Normally a circuit of this type would operate best with low-current SCR loads. The energy stored in the timing capacitor 12 would not ordinarily be sufficient to drive the SCR cathode 31 positive for a long enough time for SCR turn OFF if the SCR ON current gets very high.

However, the amplifier 27 permits the circuit to accommodate relatively-large SCR load currents. It operates as a power amplifier for the UJT 25 output pulse through the lead 38 and on to the SCR 26. The resistor 53 is adjusted to give the necessary current to turn OFF the SCR 26 for different load currents as may be necessary to operate different relays or other load devices.

It may also be noted that the capacitor 49 across the relay assists in SCR turn ON and turn OFF. If the capacitor is not there and the SCR is gated, the current through the relay and SCR may increase too slowly because of the inductance presented by the relay coil 48. If the current has not reached a value equal to or greater than the holding current of the SCR 26 by the time the pulse on the gate 33 is gone, the SCR 26 will turn OFF. The capacitor 49 supplies the turn-on current for this period. During turn off, the opposite happens. The inductance in the relay coil tries to maintain the current in the circuit which makes the turn off unreliable if the capacitor is not there. With the capacitor across the relay, current flow is maintained through the capacitor 49 as the capacitor is discharged, and this allows the SCR to turn off.

The purpose of capacitor 37 is to filter out any supply current transient or ripple appearing on base 30 of the unijunction transistor 25 and thus cause transistor to fire at the wrong time.

The relay coil 48 is thus energized and deenergized to continue the pulsing operation of the system at a rate which is determined by the rate of build up of the RC circuit 12–15–16. As described, this is set by the control device or resistor element 15 thereof in the present example. To utilize the timed pulsing action for external control, the auxiliary relay contacts 55 are provided and may be connected, as shown, and described, to operate the ratchet or other type relay 60 or provide other pulse switching action as by the contact 58, through the output terminals 63–64–65 and external circuits as may be connected therewith.

I claim:

1. An electronic pulsing timer system comprising in combination, a silicon controlled rectifier device having anode and cathode electrodes and a gate electrode, direct-current positive and negative supply leads for said system, a relay having a coil connected in series with said rectifier device between the anode electrode thereof and the positive supply lead, a cathode bias resistor connected between the cathode electrode and the negative supply lead, a gate electrode biasing resistor connected between the gate and cathode electrodes, a resistance-capacitance timing circuit connected between said supply leads and including a series variable resistor element connected with the positive supply lead and a timing capacitor having positive and negative terminals connected respectively with said resistor element and the negative supply lead, a set of single-pole double-throw contacts for said relay comprising two spaced fixed contacts and a movable contact element therefor normally closed with one of said fixed contacts and connected between the cathode and the cathode bias resistor, means providing a conductive circuit connection between said one of the fixed relay contacts and the negative terminal of said timing capacitor, a transistor amplifier having a base and emitter and collector electrodes, a unijunction transistor having a diode electrode connected with the positive terminal of the timing capacitor and having first and second base electrodes, the collector electrode of said amplifier and the second base electrode each having an operating-current connection with the positive supply lead, the first base electrode having a circuit connection through the base-emitter path of said amplifier with the gate electrode and the other of said fixed relay contacts, thereby to fire the unijunction transistor in response to charging of the timing capacitor and to apply the capacitor discharge through the unijunction transistor and amplifier to the gating bias resistor, and thereby to gate the silicon controlled rectifier into conduction and energize the relay coil, armature means for said coil connected to move the movable relay contact element from closure with the said one fixed contact to the other fixed contact in response to energization of said coil, thereby to short circuit the gating bias resistor and connect the cathode bias resistor to receive the next succeeding pulse from the timing capacitor and to back-bias and reset the silicon controlled rectifier and the relay contacts, and contact means connected with said relay armature element for effecting output pulse control for said system.

2. An electronic pulsing timer system as defined in claim 1, wherein the transistor amplifier is of the NPN type with the base electrode thereof connected directly with the first base electrode of the unijunction transistor and with the emitter electrode connected directly with the gate electrode of the silicon-controlled rectifier and through one of the bias resistors to the negative supply lead, and wherein the relay coil resistance is relatively high with respect to the resistance of the cathode bias resistor, thereby to bring the cathode of the silicon controlled rectifier to a relatively low positive value upon conduction through said rectifier.

3. An electronic pulsing timer system, comprising in combination, a silicon controlled rectifier having anode, cathode and gate electrodes, direct-current supply means for said system including a positive and a negative supply lead, a relay operating coil connected between the positive supply lead and the anode electrode of said rectifier device, a cathode bias resistor connected between the cathode electrode of said device and the negative supply lead, a gating bias resistor connected between the cathode and gate electrodes of said device, a set of single-pole double throw relay contacts connected to alternatively short-circuit the one or the other of the bias resistors and being normally closed to short circuit the cathode bias resistor, relay armature means connected to close said contacts to alternatively short circuit the gating bias resistor in response to gating of said rectifier and energization of the relay coil, a transistor amplifier having a base and emitter and collector elements, a timing pulse supply circuit including a unijunction transistor having a diode electrode and a first base with an output circuit connection through the base-emitter path of said amplifier and said bias resistors under control of said relay contacts, a resistance-capacitance pulse source connected with said supply leads and including a series control resistor and a timing capacitor connected to periodically fire said unijunction transistor and provide through said amplifier a bias voltage for gating and back-biasing said silicon controlled rectifier into states of conduction and nonconduction, and relay contact means operable jointly with said set of relay contacts for controlling the pulse output from said system.

4. An electronic pulsing timer system as defined in claim 3, wherein the transistor amplifier is of the NPN type with the base thereof connected directly with the first base of said unijunction transistor and with the emitter element thereof connected with the gate electrode of said silicon controlled rectifier, and wherein the timing capacitor is connected at one of its terminals with the diode electrode of the unijunction transistor and the positive supply lead through the control resistor, and at the other terminals with the negative supply lead.

5. An electronic pulsing timer system, comprising in combination, a silicon controlled rectifier having an anode and a cathode and a gate electrode, direct-current supply means for said system including a positive and a negative supply lead, a relay having an operating coil connected between the positive supply lead and the anode electrode, a cathode bias resistor connected between the cathode and the negative supply lead, a gating bias resistor connected between the cathode and gate electrode, a set of single-pole double-throw contacts for said relay connected to alternatively short-circuit the one or the other of the bias resistors and being normally closed to short-circuit the cathode bias resistor, relay armature means connected to close said contacts to alternatively short-circuit the gating bias resistor in response to gating of said rectifier and energization of the relay coil, a timing pulse supply circuit including a unijunction transistor having a first base output circuit connection through one of said bias resistors under control of said relay contacts, timing pulse amplifier means in said connection between said unijunction transistor and said bias resistors, a resistance-capacitance pulse source connected with said supply leads and including a timing capacitor connected to periodically fire said unijunction transistor and provide bias voltage for alternately gating and back-biasing said silicon controlled rectifier into respective states of conduction and nonconduction, and relay contact means operable jointly with said set of relay contacts for effecting pulse output control for said system.

6. An electronic pulsing timer system comprising in combination, a silicon controlled rectifier device having anode and cathode electrodes and a gate electrode, direct-current supply means for said system including a positive and a negative supply lead and supply terminals therefor, said negative supply lead being connected to operate at system ground potential, a relay having an operating coil connected in series with said rectifier device between the anode electrode thereof and the positive supply lead, a cathode bias resistor for said rectifier connected between the cathode electrode and the negative supply lead and having a relatively-low resistance with respect to that of the relay coil, a gate electrode biasing resistor connected between the gate and cathode electrodes, a resistance-capacitance timing circuit connected between said supply leads and including a fixed and a variable resistor element connected in series to the positive supply lead and a timing capacitor having positive and negative terminals and connected between said series connected resistor elements and the negative supply lead, a set of single-pole double-throw contacts for said relay comprising two spaced fixed contacts and a contact element movable therebetween and normally closed with one of said fixed contacts, said movable contact element being electrically connected at a point between the cathode and the cathode bias resistor, a movable armature element for the relay connected to move to said movable contact element from the one to the other of said fixed contacts in response to energizing of said relay operating coil, means providing a fixed conductive circuit connection between the one fixed relay contact and the negative terminal of said timing capacitor, a transistor amplifier of the NPN type having a base emitter and collector electrodes, a unijunction transistor having a diode electrode connected with the positive terminal of the timing capacitor and having first and second base electrodes, the collector electrode of said amplifier and the second base electrode each having a series-resistor-controlled operating-current supply connection with the positive supply lead and the first base electrode being connected directly to the base of said amplifier and having a conductive circuit connection through the base-emitter path of said amplifier from the emitter to the gate electrode of the silicon controlled rectifier and the other of said fixed relay contacts, thereby to fire the unijunction transistor in response to charging of the timing capacitor and apply the amplified capacitor discharge voltage through the said transistor and the amplifier to the gating bias resistor and to gate the silicon controlled rectifier into conduction to energize the relay coil and move said relay armature element and said movable contact element from closure with the one fixed relay contact to closure with the other, and thereby to short-circuit the gating bias resistor and connect the cathode bias resistor to receive the next succeeding pulse from the timing capacitor for back-biasing and resetting the silicon controlled rectifier and said relay contacts, and contact means connected with said relay armature element for effecting a switching output pulse control for said system.

References Cited

UNITED STATES PATENTS

| | | | |
|---|---|---|---|
| 3,289,077 | 11/1966 | Miller | 324—70 |
| 3,026,485 | 3/1962 | Suran | 331—108 |
| 3,193,733 | 7/1965 | Orrsino | 317—148.5 |
| 3,265,991 | 8/1966 | Ferguson | 331—111 |

J. D. MILLER, Primary Examiner

C. YATES, Assistant Examiner

U.S. Cl. X.R.

307—132